(12) United States Patent
Shain

(10) Patent No.: US 6,832,234 B2
(45) Date of Patent: Dec. 14, 2004

(54) IN-PLACE ASSOCIATIVE PROCESSOR ARITHMETIC

(75) Inventor: Joseph Shain, Tel Aviv (IL)

(73) Assignee: Neumagic Israel Ltd., Netanya (IL)

(*) Notice: Subject to any disclaimer, the term of this patent is extended or adjusted under 35 U.S.C. 154(b) by 258 days.

(21) Appl. No.: 10/140,988

(22) Filed: May 9, 2002

(65) Prior Publication Data

US 2003/0187896 A1 Oct. 2, 2003

Related U.S. Application Data

(63) Continuation of application No. 10/108,451, filed on Mar. 29, 2002.

(51) Int. Cl.$^7$ ................................................ G06F 7/50
(52) U.S. Cl. ........................................ 708/709; 708/670
(58) Field of Search ................................. 708/709, 670

(56) References Cited

U.S. PATENT DOCUMENTS

| | | | | |
|---|---|---|---|---|
| 3,576,436 A | * | 4/1971 | Lindquist | 708/670 |
| 3,757,312 A | * | 9/1973 | Shore et al. | 365/49 |
| 4,287,566 A | * | 9/1981 | Culler | 708/607 |
| 4,491,932 A | * | 1/1985 | Ruhman et al. | 382/131 |
| 5,805,490 A | * | 9/1998 | Machida | 708/700 |
| 5,943,502 A | * | 8/1999 | Sariel et al. | 712/16 |
| 6,195,738 B1 | * | 2/2001 | Akerib | 712/12 |

* cited by examiner

Primary Examiner—David H. Malzahn
(74) Attorney, Agent, or Firm—Mark M. Friedman

(57) ABSTRACT

A method of performing in-place arithmetic, particularly addition and subtraction, on numbers stored in respective consecutive rows of an array processor that has two tags registers. In a first machine cycle per bit, results of logical operations are stored in the tags registers, and the tags registers are shifted to align the intermediate results with other rows. In a second machine cycle per bit, results of further logical operations are stored in the tags registers, and the tags registers are shifted back to align the new intermediate results with the original rows.

58 Claims, 5 Drawing Sheets

IN-PLACE ASSOCIATIVE PROCESSOR ARITHMETIC

This is a continuation in part of U.S. patent application Ser. No. 10/108,451, filed Mar. 29, 2002.

FIELD AND BACKGROUND OF THE INVENTION

The present invention relates to associative processors and, more particularly, to a method of performing arithmetical operations such as addition and subtraction on numbers stored in the associative array of an associative processor.

An associative processor is a device for parallel processing of a large volume of data. FIG. 1 is a schematic illustration of an associative processor 10. The heart of associative processor 10 is an array 12 of content addressable memory (CAM) cells 14 arranged in rows 16 and columns 18. Associative processor 10 also includes four registers for controlling CAM cells 14: two tags registers 20a and 20b that include many tag register cells 22, a mask register 24 that includes many mask register cells 26, and a pattern register 28 that includes many pattern register cells 30. Each cell 14, 22, 26 or 30 is capable of storing one bit (0 or 1). Each tags register 20 is a part of a tags logic block 36 that communicates with each row 16 via a dedicated word enable line 32 and a dedicated match result line 34, with each tag register cell 22 being associated with a respective row 16 via word enable line 32, match result line 34 and a dedicated logic unit 38. Each mask register cell 26 and each pattern register cell 30 is associated with a respective column 18. For illustrational simplicity, only three rows 16, only one word enable line 32, only one match result line 34 and only two logic units 38 are shown in FIG. 1. Note that the two tag register cells 22 that are associated with the same row 16 share the same word enable line 32 and the same match result line 34. Typical arrays 12 include 8192 ($2^{13}$) rows 16. The array 12 illustrated in FIG. 1 includes 32 columns 18. More typically, array 12 includes 96 or more columns 18.

Each machine cycle of associative processor 10 is either a compare cycle or a write cycle. Correspondingly, in a single machine cycle of associative processor 10, each CAM cell 14 performs one and only one of two kinds of elementary operations, as directed by the contents of the corresponding cells 22, 26 or 30 of registers 20a, 20b, 24 and 28: either a compare operation or a write operation. For both kinds of elementary operations, columns 18 that are to be active are designated by the presence of "1" bits in the associated mask register cells 26. The contents of tag register cells 22 of one of tags logic blocks 36 are broadcast to the associated rows 16 as "write enable" signals by that tags logic block 36 via word enable lines 32, with rows 16 that receive a "1" bit being activated. In a compare cycle, each activated row 16 generates a "1" bit match signal on match result line 34 of that row 16. Each activated CAM cell 14 of that row 16 compares its contents with the contents of the cell 30 of pattern register 28 that is associated with the column 18 of that CAM cell 14. If the two contents are identical (both "0" bits or both "1" bits), that CAM cell 14 allows the match signal to pass. Otherwise, that CAM cell 14 blocks the match signal. As a result, if the contents of all the activated CAM cells 14 of a row 16 match the contents of corresponding cells 30 of pattern register 28, the match signal reaches tags logic blocks 36. In a write cycle, the contents of pattern register cells 30 associated with activated columns 18 are written to the activated CAM cells 14 of those columns 18.

In the example illustrated in FIG. 1, the fifth through eighth columns 18 from the right are activated by the presence of "1"s in the corresponding mask register cells 26. A binary "4" (0100) is stored in the corresponding pattern register cells 30. A compare cycle performed by associative processor 10 in this configuration tests activated rows 16 to see if a binary "4" is stored in their fifth through eighth CAM cells 14 from the right. A write cycle performed by associative processor 10 in this configuration writes binary "4" to the fifth through eighth CAM cells 14 from the right of activated rows 16.

Each logic unit 38 can be configured to perform, in a single machine cycle, one or more of several logical operations (AND, OR, NOT, XOR, identity) whose inputs are one or more of: the bit stored in the associated tag register cell 22, the bit stored in the corresponding tag register cell 22 in the other tags logic block 36, and, if the cycle is a compare cycle, the presence or absence of a match signal on match result line 34. The AND, OR and XOR operations are binary operations (two inputs). The NOT and identity operations are unary operations (one input). The presence of a match signal on match result line 34 is treated as a binary "1". The absence of a match signal on match result line 34 is treated as a binary "0". The result of the logical operation is a single bit that is stored in the associated tag register cell 22. In the simplest set of logical operations, in a compare cycle, the only input is the presence or absence of a match signal on match result line 34 and the sole logical operation is an identity operation. The result of this operation is the writing to the associated tag register cell 22 of the bit corresponding to the presence or absence of a match signal on match result line 34.

In summary, in both kinds of elementary operations, tags register 20a or 20b and mask register 24 provide activation signals and pattern register 28 provides reference bits. Then, in a compare cycle, array 12 provides input to compare with the reference bits and tags registers 20a and 20b receive output; and in a write cycle, array 12 receives output that is identical to one or more reference bits.

Tags logic blocks 36a and 36b also can broadcast "1"s to all rows 16, to activate all rows 16 regardless of the contents of tags registers 20.

An additional function of tags registers 20 is to provide communication between rows 16. For example, suppose that the results of a compare operation executed on rows 16 have been stored in tags register 20a, wherein every bit corresponds to a particular row 16. By shifting tags register 20a, the results of this compare operation are communicated from their source rows 16 to other, target rows 16. In a single tags shift operation the compare result of every source row 16 is communicated to a corresponding target row 16, the distance between any source row 16 and the corresponding target row 16 being the distance of the shift.

More information about associative processors may be found in U.S. Pat. No. 5,974,521, to Akerib, which is incorporated by reference for all purposes as if fully set forth herein.

A prior art method of adding a first set of Q binary numbers {a(q), q=1 ... Q}, stored in a first set of columns 18, to another set of Q binary numbers {b(q), q=1 ... Q}, stored in a second set of columns 18, and storing the resulting Q binary numbers {s(q), q=1 ... Q} in a third set of columns 18, is taught by Daniel P. Siewiorek et al. in Computer Structures: Principles and Examples, Chapter 21: "A productive implementation of an associative array processor: STARAN 319", McGraw-Hill, N.Y. (1982), also available at the URL http://www.ulib.org/webRoot/Books/Saving_Bell_Books/SBN%20Co mputer%20Strucutres/csp0336.htm.

Without loss of generality, all the input numbers {a(q)} and {b(q)} can be assumed to have the same number of bits, because any number that is shorter than the longest input number can be left-padded with "0" bits. For any particular index q, a(q) and b(q) are initially stored in the same row 16, in different sets of respective columns 18, and s(q) is to be stored in the same row 16, typically in its own set of columns 18, although either a(q) or b(q) can be partly or completely overwritten with s(q) because once a bit of s(q) is computed, the bits of a(q) and b(q) that contributed to that bit of s(q) are no longer needed.

FIG. 2 is a flow chart of the algorithm of Sieworek et al. The input numbers are assumed to be M bits long. The m-th bit of a number a, b or s is designated by a[m], b[m] or s[m]. "x" refers to a bit stored in the tag register cell 22 of tags register 20a that is associated with the row 16 that stores the numbers a, b and s. "y" refers to a bit stored in the tag register cell 22 of tags register 20b that is associated with the row 16 that stores the numbers a, b and s. The symbol ":=" means "replacement", as in ALGOL. At each stage of the loop over the bit index m, the carry bits are stored in tags register 20b.

The activities of array processor 10 in each of the blocks of FIG. 2 now will be described in detail.

In the initialization step (block 40), all tag register cells 22 are set to zero, for example by all logic units 38 performing the logical operation XOR with both inputs being whatever bits are initially in tag register cells 22. In addition, all pattern register cells 30 are set to "1".

The first machine cycle in the loop over m (block 42) is a compare cycle. All mask register cells 26 are set to "0" except for the mask register cell 26 corresponding to the column 18 that stores bits a[m]. One of tags logic blocks 36 broadcasts "1"s to all rows 16. The resulting match signals indicate whether the respective bits a[m] are "0" or "1". Each logic unit 38 of tags logic block 36a performs an AND operation whose two inputs are the bit corresponding to the match signal received via match result line 34 and the bit previously stored in the corresponding tag register cell 22 of tags register 20b. Each logic unit 38 of tags logic block 36a then performs an XOR operation whose two inputs are the result of the AND operation and the bit previously stored in the associated tag register cell 22 of tags register 20a. The result of this XOR operation is stored in the associated tag register cell 22 of tags register 20a. Meanwhile, each logic unit 38 of tags logic block 36b performs an XOR operation whose two inputs are the bit corresponding to the match signal received via match result line 34 and the bit previously stored in the associated tag register cell 22 of tags register 20b. The result of this XOR operation is stored in the associated tag register cell 22 of tags register 20b.

The second machine cycle in the loop over m (block 44) is a compare cycle. All mask register cells 26 are set to "0" except for the mask register cell 26 corresponding to the column 18 that stores bits b[m]. One of tags logic blocks 36 broadcasts "1"s to all rows 16. The resulting match signals indicate whether the respective bits b[m] are "0" or "1". Each logic unit 38 of tags logic block 36a performs an AND operation whose two inputs are the bit corresponding to the match signal received via match result line 34 and the bit previously stored in the corresponding tag register cell 22 of tags register 20b. Each logic unit 38 of tags logic block 36a then performs an XOR operation whose two inputs are the result of the AND operation and the bit previously stored in the associated tag register cell 22 of tags register 20a. The result of this XOR operation is stored in the associated tag register cell 22 of tags register 20a. Meanwhile, each logic unit 38 of tags logic block 36b performs an XOR operation whose two inputs are the bit corresponding to the match signal received via match result line 34 and the bit previously stored in the associated tag register cell 22 of tags register 20b. The result of this XOR operation is stored in the associated tag register cell 22 of tags register 20b.

The third machine cycle in the loop over m (block 46) is a write cycle. All mask register cells 26 are set to "0" except for the mask register cell 26 corresponding to the column 18 that is to store bits s[m]. Tags logic block 36b broadcasts the contents of tag register cells 22 of tags register 20a to all rows 16, as write enable signals. This results in the contents of tag register cells 22 of tags register 20a being written to the column 18 that is to store bits s[m]. Meanwhile, each logic unit 38 of tags logic block 36a performs an XOR operation whose two inputs are the bit previously stored in the associated tag register cell 22 of tags register 20a and the bit previously stored in the corresponding tag register cell 22 of tags register 20b. The result of this XOR operation is stored in the associated tag register cell 22 of tags register 20a.

The fourth machine cycle in the loop over m (block 48) may be either a compare cycle or a write cycle, because no data are exchanged between array 12 and tags registers 20 in this machine cycle. Each logic unit 38 of tags logic block 36a performs an XOR operation whose two inputs both are the bit previously stored in the associated tag register cell 22 of tags register 20a. The result of this XOR operation is stored in the associated tag register cell 22 of tags register 20a. Meanwhile, each logic unit 38 of tags logic block 36b performs an XOR operation whose two inputs are the bit previously stored in the corresponding tag register cell 22 of tags register 20a and the bit previously stored in the associated tag register cell 22 of tags register 20b. The result of this XOR operation is stored in the associated tag register cell 22 of tags register 20b.

In block 50, the bit index m is incremented. In block 52, m is tested to see if all input bits have been processed. If there are more input bits to process, the algorithm returns to block 42. Otherwise, in block 54, all mask register cells 26 are set to "0" except for the mask register cell 26 corresponding to the column 18 that is to store the final carry bits, bits s[M+1]. Tags logic block 36b broadcasts the contents of tag register cells 22 of tags register 20a to all rows 16, as write enable signals. This results in the contents of tag register cells 22 of tags register 20a being written to the column 18 that is to store bits s[M+1].

SUMMARY OF THE INVENTION

Shain, in U.S. patent application Ser. No. 10/108,451, which is incorporated by reference for all purposes as if fully set forth herein, teaches improved algorithms for addition and subtraction using an associative processor. Unlike the algorithm of Sieworek et al., these algorithms require only three machine cycles per pair of input bits. Shain's algorithms have certain other advantages over the algorithm of Sieworek et al., as explained in U.S. Pat. No. 10/108,451. Nevertheless, all known prior art algorithms require that the numbers being combined be stored initially in separate sets of columns 18. There are applications in which it would be desirable to store all the numbers involved in the same set of columns 18. For example, in image processing, it often is desirable to combine all pixels that are separated by a fixed distance. The present invention enables such a parallel image processing operation to be performed without storing all the pixel values twice in two different sets of columns 18.

According to the present invention, given Q binary numbers a(q), where q is an index between 1 and Q, all of the binary numbers having a common number M of bits indexed by an index m between 1 and M, there is provided a method of, for a positive integer P that is less than Q and for all values of q between 1 and P, combining a(q) with a(q+Q−P) to produce M combination bits, including the steps of: (a) providing an array processor that includes an array of content addressable memory (CAM) cells; (b) storing the binary numbers in respective consecutive rows of the array; (c) for each value of m between 1 and M: substantially simultaneously, for each value of q between 1 and P: performing at least one first logical operation having a match signal corresponding to the m-th bit of a(q) as an input thereof, thereby producing a first output, and (d) for each value of m between 1 and M: substantially simultaneously, for each value of q between 1 and P: performing at least one second logical operation having, as inputs thereof, a match signal corresponding to the m-th bit of a(q+Q−P) and the first output, thereby producing a second output.

According to the present invention, given Q binary numbers a(q), where q is an index between 1 and Q, all of the binary numbers having a common number M of bits indexed by an index m between 1 and M, there is provided a method of, for a positive integer P that is less than Q and for all values of q between 1 and P, adding a(q) to a(q+Q−P), including the steps of: (a) providing an array processor that includes an array of content addressable memory (CAM) cells; (b) storing the binary numbers in respective consecutive rows of the array; (c) for each value of m between 1 and M: substantially simultaneously, for each value of q between 1 and P: (i) performing at least one first logical operation having, as inputs thereof, a match signal corresponding to the m-th bit of a(q) and a respective carry bit, thereby producing a first output, and (ii) performing at least one second logical operation having, as inputs thereof, the match signal corresponding to the m-th bit of a(q) and the respective carry bit, thereby producing a second output; and (d) for each value of m between 1 and M: substantially simultaneously, for each value of q between 1 and Q: (i) performing at least one third logical operation having, as inputs thereof, a match signal corresponding to the m-th bit of a(q+Q−P) and the first output, thereby producing a third output, and (ii) performing at least one fourth logical operation having, as inputs thereof, the match signal corresponding to the m-th bit of a(q+Q−P) and the second output, thereby providing a fourth output.

According to the present invention, given Q binary numbers a(q), where q is an index between 1 and Q, all of the binary numbers having a common number M of bits indexed by an index m between 1 and M, there is provided a method of, for a positive integer P that is less than Q and for all values of q between 1 and P, subtracting a(q+Q−P) from a(q), including the steps of: (a) providing an array processor that includes an array of content addressable memory (CAM) cells; (b) storing the binary numbers in respective consecutive rows of the array; and (c) for each value of m between 1 and M: substantially simultaneously, for each value of q between 1 and P: (i) performing at least one first logical operation having, as inputs thereof, a match signal corresponding to the m-th bit of a(q) and a respective carry bit, thereby producing a first output, and (ii) performing at least one second logical operation having, as inputs thereof, the match signal corresponding to the m-th bit of a(q) and the respective carry bit, thereby producing a second output; and (d) for each value of m between 1 and M: substantially simultaneously, for each value of q between 1 and Q: (i) performing at least one third logical operation having, as inputs thereof, a match signal corresponding to the m-th bit of a(q+Q−P) and the first output, thereby producing a third output, and (ii) performing at least one fourth logical operation having, as inputs thereof, the match signal corresponding to the m-th bit of a(q+Q−P) and the second output, thereby providing a fourth output.

The present invention is a method of in-place associative processor arithmetic. Given an ordered set of Q binary input numbers a(q), where q is an index that runs from 1 through Q, the numbers a(q) are stored, in order, in consecutive rows 16, one number a(q) per row 16. Without loss of generality, if the longest number a(q) has M bits, all the input numbers can be regarded as having a common number M of bits, because any number that is shorter than M bits can be left-padded with "0" bits; and all the numbers a(q) are stored in a common set of M adjacent columns 18. The present invention is a method of, for each of the first P<Q numbers a(q), combining a(q) with a(q+Q−P) in-place. In other words, with the possible exception of carry bits left over at the end of the associative processor operations described herein, no output bits are ever stored in any of CAM cells 14 other than CAM cells 14 that are initially used to store the numbers a(q). Although the scope of the present invention includes any arithmetic combination of a(q) with a(q+Q−P), the focus herein is on addition and subtraction, i.e., obtaining the sum a(q)+a(q+Q−P) or the difference a(q)−a(q+Q−P). More specifically, the focus herein is on an in-place implementation of the improved algorithms of Shain.

Letting m be an index that runs from 1 to M to index the bits of the numbers a(q) from least significant (m=1) to most significant (m=M), the present invention operates on one column 18 at a time, starting from the column 18 that stores the least significant bits and ending with the column 18 that stores the most significant bits. For each value of m, and for each value of q between 1 and P, the inputs are a(q), a(q+Q−P), and a carry bit y, from the previous column 18, that is stored in the q-th tag register cell 22 of tags register 20*b*. (For the m=1 column 18, all carry bits y are initialized to 0.) In the first machine cycle, for each value of q between 1 and P, the q-th logic unit 38 of tags register 20*a* executes a set of one or more logical operations on a match signal corresponding to the m-th bit of a(q) and on y, and stores the output bit of those logical operations in the q-th tag register cell 22 of tags register 20*a*. Meanwhile, for each value of q between 1 and P, the q-th logic unit 38 of tags register 20*b* executes another set of one or more logical operations on the match signal corresponding to the m-th bit of a(q) and on y, and stores the output bit of those logical operations in the q-th tag register cell 22 of tags register 20*b*. Then both tags register 20*a* and tags register 20*b* are shifted by Q−P, so that, for each value of q between 1 and P, the bits previously stored in the q-th tag register cell 22 of tags registers 20*a* and 20*b* now are stored in the q+Q−P-th tag register cell 22 of tags registers 20*a* and 20*b*. In the second machine cycle, for each value of q between 1 and P, the q+Q−P-th logic unit 38 of tags register 20*a* executes yet another set of one or more logical operations on a match signal corresponding to the m-th bit of a(q+Q−P) and on the bit in the q+Q−P-th tag register cell 22 of tags register 20*a*, and stores the output bit of those logical operations in the q+Q−P-th tag register cell 22 of tags register 20*a*. Meanwhile, for each value of q between 1 and P, the q+Q−P-th logic unit 38 of tags register 20*b* executes still another set of one or more logical operations on the match signal corresponding to the m-th bit of a(q+Q−P) and on the bit in the q+Q−P-th tag register cell 22 of tags register 20b, and stores the output bit of those logical operations in the q+Q−P-th tag register cell 22 of tags register 20b. Then both tags register 20a and tags register 20b are shifted by P-Q, so that, for each value of q between 1 and P, the bits previously stored in the q+Q−P-th tag register cell 22 of tags registers 20a and 20b now are stored in the q-th tag register cell 22 of tags registers 20a and 20b.

At this point, if the logical operations have been those of Shain's improved algorithms, then, depending on the nature of the logical operations performed, the desired combination bits may be found either in tag register cells 22 of tags register 20a or in tag register cells 22 of tags register 20b. These bits now are written to the column 18 that is to receive the output of the combination of the m-th bits of a(q) and a(q+Q−P), for q=I through P. Preferably, for each value of q between 1 and P, the m-th bit of a(q) is replaced with the desired combination bit, to keep the processing within the original M columns 18 to the extent possible. This is allowed because the input bit that is being replaced is no longer needed.

In the accompanying claims, the set of one or more logical operations, that are executed by logic units 38 of tags register 20a in the first machine cycle, is called the "first" set of logical operations, with the output of that set of logical operations being called the "first" output; and the set of one or more logical operations, that are executed by logic units 38 of tags register 20b in the second machine cycle, is called the "fourth" set of logical operations, with the output of that set of logical operations being called the "fourth" output. In some of the claims, the set of one or more logical operations, that are executed by logic units 38 of tags register 20b in the first machine cycle, is called the "second" set of logical operations, with the output of that set of logical operations being called the "second" output; and the set of one or more logical operations, that are executed by logic units 38 of tags register 20a in the second machine cycle, is called the "third" set of logical operations, with the output of that set of logical operations being called the "third" output. In others of the claims, the set of one or more logical operations, that are executed by logic units 38 of tags register 20a in the second machine cycle, is called the "second" set of logical operations, with the output of that set of logical operations being called the "second" output; and the set of one or more logical operations, that are executed by logic units 38 of tags register 20b in the first machine cycle, is called the "third" set of logical operations, with the output of that set of logical operations being called the "third" output. Nevertheless, each set of claims is internally self-consistent with regard to these two usages of "second" and "third", so that no confusion arises.

The present implementation of Shain's algorithms retains their advantages over the prior art algorithm of Sieworek et al. Specifically:

1. As noted above, Shain's algorithms include only three machine cycles per pair of input bits: two compare cycles and one write cycle.

2. In Shain's algorithms, the bits x that are stored in tag register cells 22 of tags register 20a are neither initialized before the loop over m nor shared between successive iterations of the loop over m. Only the carry bits (y), that are stored in tag register cells 22 of tags register 20b, are initialized (to "0") before the loop over m and shared between successive iterations of the loop over m.

3. Shain's second addition algorithm includes only five logical operations (two ANDs, two XORs, one OR) per pair of input bits, vs. nine logical operations per pair of input bits in the algorithm of Sieworek et al. Similarly, Shain's subtraction algorithm of the present invention includes only seven logical operations (two ANDs, two XORs, two NOTs, one OR) per pair of input bits, of which only five are binary logical operations.

4. In Shain's second addition algorithm, for each value of q between 1 and P, only three of the logical operations include a(q+Q−P) as a direct or indirect argument, vs. six logical operations in the algorithm of Sieworek et al. Similarly, in Shain's subtraction algorithm, for each value of q between 1 and P, only four of the logical operations include a(q+Q−P) as a direct or indirect argument.

5. Both Shain's second addition algorithm and Shain's subtraction algorithm include OR operations. The algorithm of Sieworek et al. lacks OR operations.

6. In both Shain's second addition algorithm and Shain's subtraction algorithm, there are only two XOR operations per pair of input bits, vs. seven XOR operations in Sieworek's algorithm.

7. In both Shain's second addition algorithm and Shain's subtraction algorithm, only logic units 38 of tags logic block 36a perform XOR operations. It follows that only logic units 38 of tags logic blocks 36a need to be configured to do XOR operations. This leads to a simplification of associative processor 10, because the hardware needed to perform an XOR operation is more complicated than the hardware needed to perform the other logical operations.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an in-place method of performing arithmetic using an associative processor. Specifically, the present invention can be used to perform Shain's improved addition and subtraction algorithms in place.

The principles and operation of in-place associative processor arithmetic according to the present invention may be better understood with reference to the drawings and the accompanying description.

Figure 3:
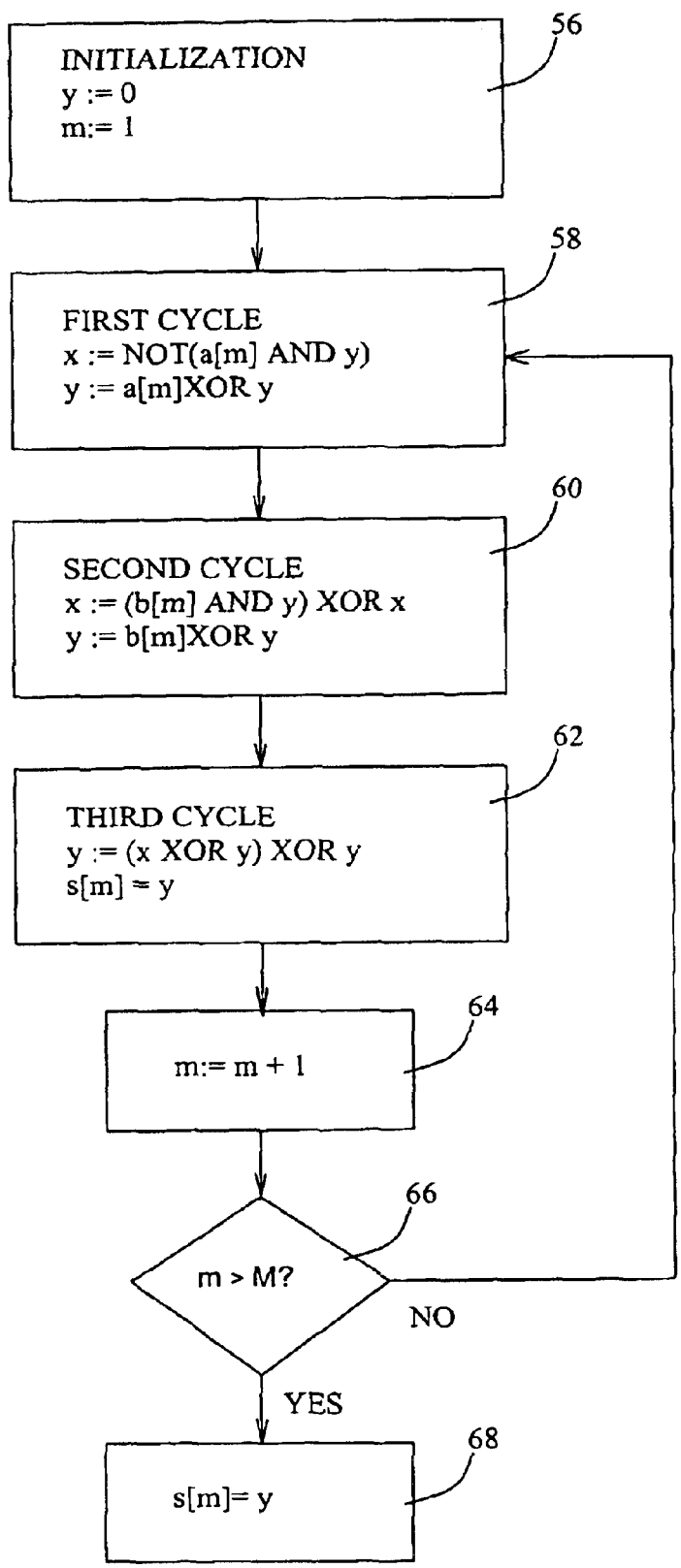
FIG. 3 is a flow chart of Shain's first addition algorithm, as implemented according to the present invention.
Figure 4:
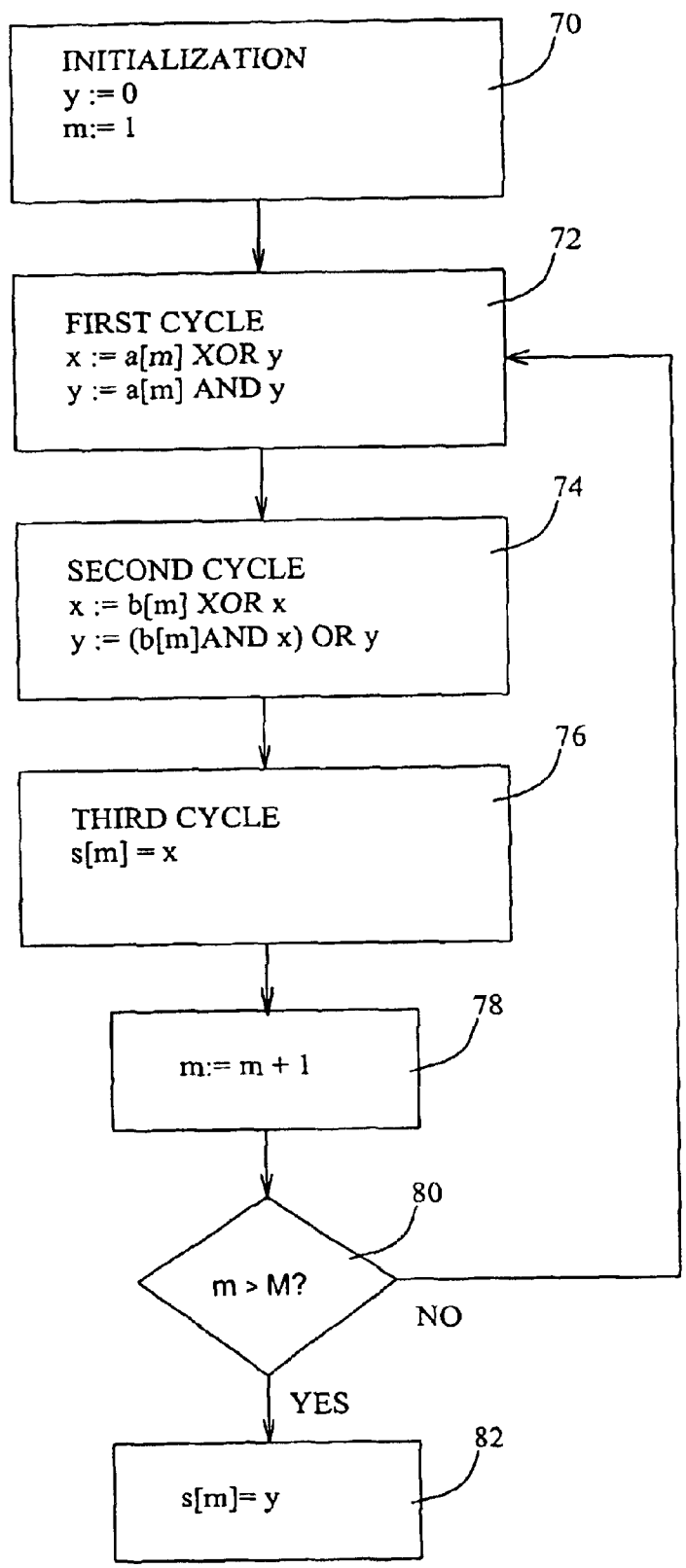
FIG. 4 is a flow chart of Shain's second addition algorithm, as implemented according to the present invention.
Figure 5:
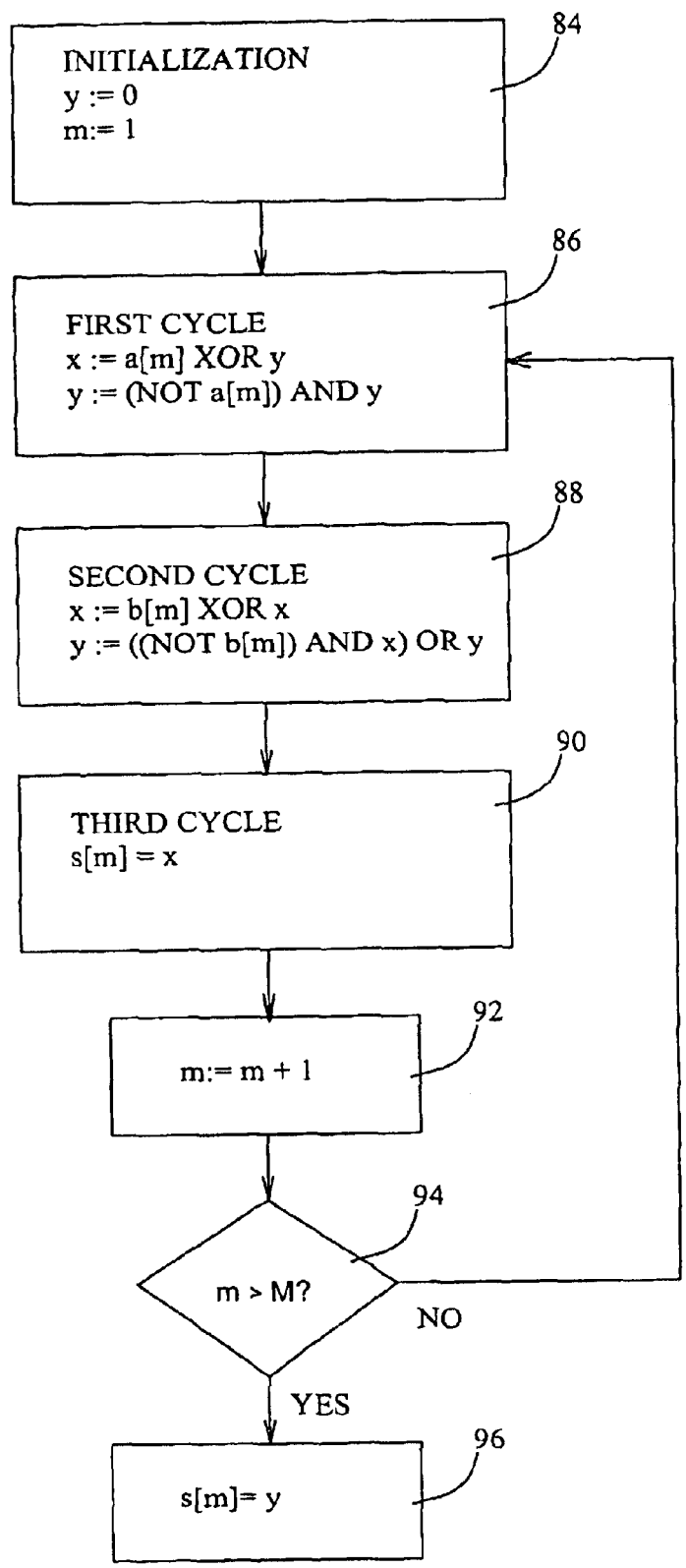
FIG. 5 is a flow chart of Shain's subtraction algorithm, as implemented according to the present invention.

Referring again to the drawings, FIGS. 3, 4 and 5 are, respectively, flow charts of Shain's first addition algorithm, Shain's second addition algorithm, and Shain's subtraction algorithm, as implemented according to the present invention. These flow charts assume that an ordered set of Q binary numbers a(q), each M bits long, have been stored in consecutive rows 16 of CAM cell array 12, one number a(q) per row, with the numbers a(q) spanning a common set of M columns 18. For each value of q between 1 and P<Q, the flow charts of FIGS. 3 and 4 show how to replace a(q) with a(q)+a(q+Q−P) and the flow chart of FIG. 5 shows how to replace a(q) with a(q)−a(q+Q−P).

Figure 1:
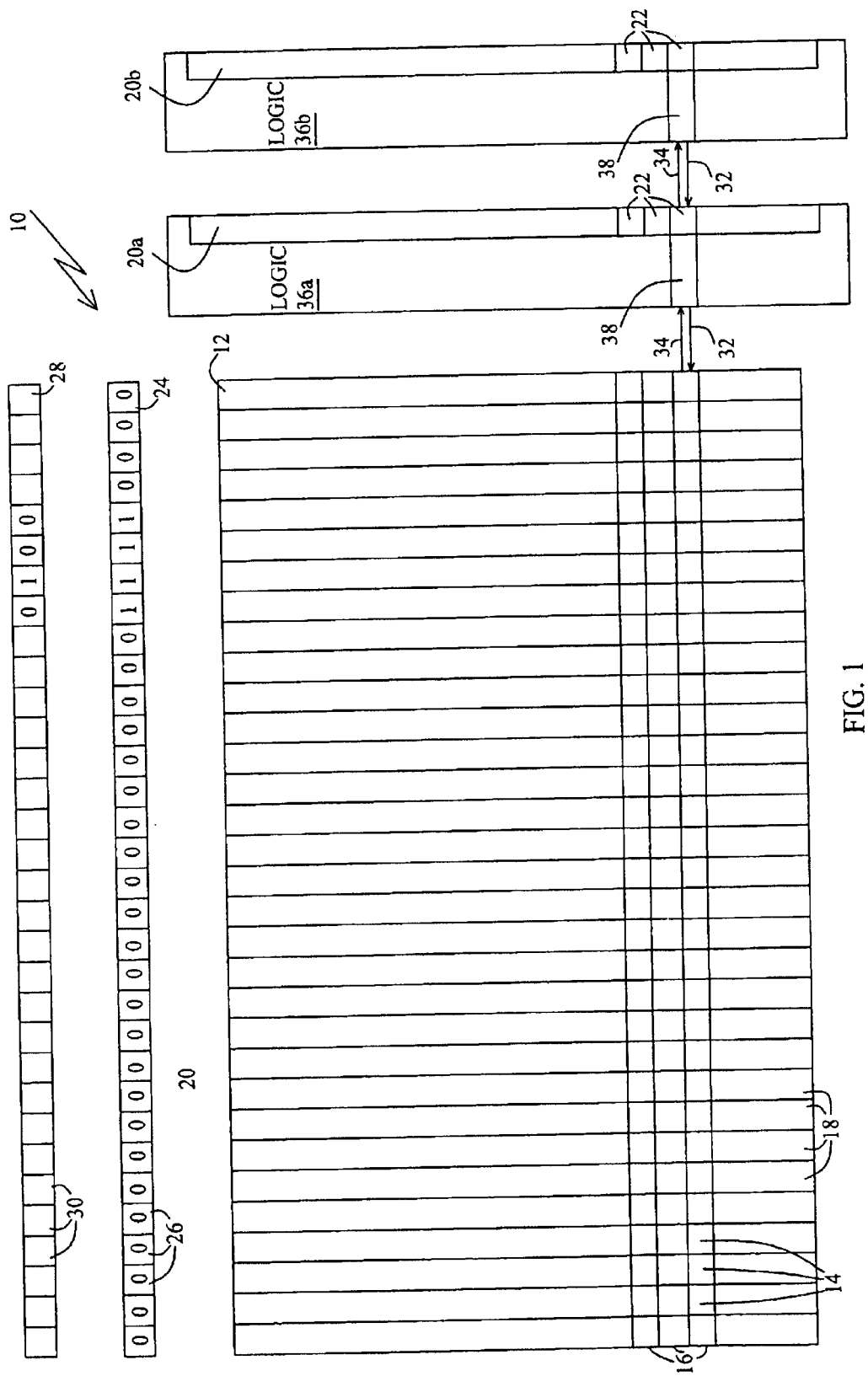
FIG. 1 is a schematic illustration of an associative processor.
Figure 2:
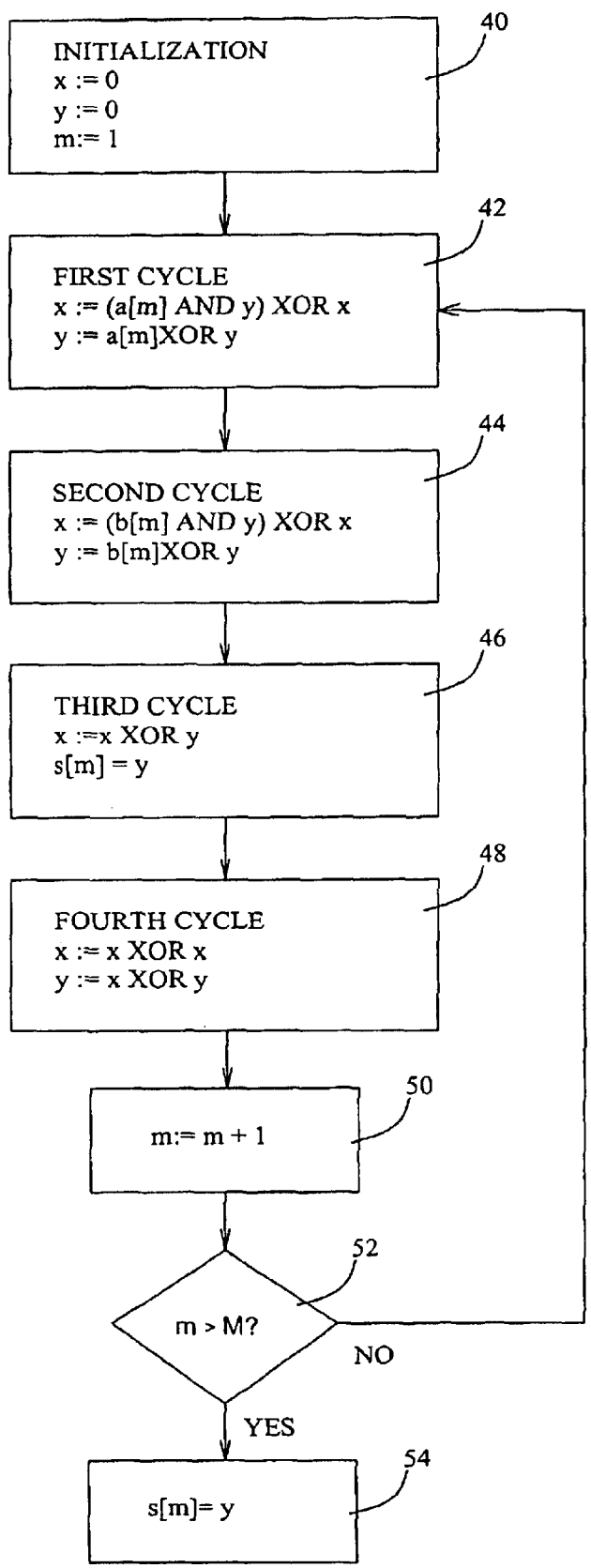
FIG. 2 is a flow chart of the prior art addition algorithm of Sieworek et al.

The flow charts of FIGS. 3, 4 and 5 are similar in form to the flow chart of FIG. 2. The formal differences relate to the fact that the flow chart of FIG. 2 is for adding two sets of numbers stored in two different sets of respective columns 18 to obtain corresponding sums that could be written over one of the input sets or alternatively could be stored in yet a third set of columns 18. Consequently, the flow chart of FIG. 2 illustrates addition of a single input number a to a single input number b to obtain a single output number s. In FIG. 2, "x" refers to a single bit stored in a tag register cell 20 of tags register 20a and "y" refers to a single bit stored in a tag register cell 20 of tags register 20b. The flow charts of FIGS. 3, 4 and 5 are for adding and subtracting within a single set of numbers stored in a single set of columns 18, with intermediate results shifted as necessary between rows 16. Consequently, the subscript q is not suppressed in these flow charts. "x[q]" and "y[q]" refer to single bits stored in tag register cells 20 that correspond to a particular row 16; and unsubscripted "x" and "y" refer to tags registers 20 collectively.

Taking these notational differences into account, many of the blocks of FIGS. 3, 4 and 5 have corresponding blocks in FIG. 2. Initialization blocks 56, 70 and 84 correspond to initialization block 40, except that x is not initialized. Bit index increment blocks 64, 78 and 92 correspond to index increment block 50. Bit index test blocks 66, 80 and 94 correspond to index test block 52. The storage of the final set of carry bits in blocks 68, 82 and 96 corresponds to the storage of the final carry bit in block 54.

The activities of array processor 10 in blocks 58, 60 and 62 of FIG. 3 now will be described in detail.

Block 58 is a compare cycle. All mask register cells 26 are set to "0" except for the mask register cell 26 corresponding to the column 18 that stores bits a[m;q]. One of tags logic blocks 36 broadcasts "1"s to all rows 16. The resulting match signals indicate whether the respective bits a[m;q] are "0" or "1". Each logic unit 38 of tags logic block 36a performs an AND operation whose two inputs are the bit corresponding to the match signal received via match result line 34 and the bit previously stored in the corresponding tag register cell 22 of tags register 20b. Each logic unit 38 of tags logic block 36a then performs a NOT operation whose input is the result of the AND operation. The result of this NOT operation is stored in the associated tag register cell 22 of tags register 20a. Meanwhile, each logic unit 38 of tags logic block 36b performs an XOR operation whose two inputs are the bit corresponding to the match signal received via match result line 34 and the bit previously stored in the associated tag register cell 22 of tags register 20b. The result of this XOR operation is stored in the associated tag register cell 22 of tags register 20b. Finally, both tags registers 20a and 20b are shifted by Q−P to move the intermediate results in tags registers 20a and 20b to the rows 16 that will need these intermediate results in block 60. As a result of the shift, for each value of q between 1 and P, the intermediate results x[q] and y[q] that, prior to the shift, were stored in tag register cells 22 associated with the row 16 wherein a(q) is stored, now are stored in tag register cells 22 associated with the row 16 wherein a(q+Q−P) is stored.

Block 60 also is a compare cycle. All mask register cells 26 are set to "0" except for the mask register cell 26 corresponding to the column 18 that stores bits a[m;q]. One of tags logic blocks 36 broadcasts "1"s to all rows 16. The resulting match signals indicate whether the respective bits a[m;q] are "0" or "1". Each logic unit 38 of tags logic block 36a performs an AND operation whose two inputs are the bit corresponding to the match signal received via match result line 34 and the bit previously stored in the corresponding tag register cell 22 of tags register 20b. Each logic unit 38 of tags logic block 36a then performs an XOR operation whose two inputs are the result of the AND operation and the bit previously stored in the associated tag register cell 22 of tags register 20a. The result of this XOR operation is stored in the associated tag register cell 22 of tags register 20a. Meanwhile, each logic unit 38 of tags logic block 36b performs an XOR operation whose two inputs are the bit corresponding to the match signal received via match result line 34 and the bit previously stored in the associated tag register cell 22 of tags register 20b. The result of this XOR operation is stored in the associated tag register cell 22 of tags register 20b. Finally, both tags registers 20a and 20b are shifted by P−Q, so that, for each value of q between 1 and P, the intermediate results x[q] and y[q] are once again stored in tag register cells 22 associated with the row 16 wherein a(q) is stored.

Block 62 is a write cycle. All mask register cells 26 are set to "0" except for the mask register cell 26 corresponding to the column 18 that stores bits a[m;q]. Tags logic block 36b broadcasts the contents of tag register cells 22 of tags register 20a to all rows 16, as write enable signals. This results in the contents of tag register cells 22 of tags register 20b being written over a[m;q]. Meanwhile, each logic unit 38 of tags logic block 36b performs an XOR operation whose two inputs are the bit previously stored in the associated tag register cell 22 of tags register 20b and the bit previously stored in the corresponding tag register cell 22 of tags register 20a. Each logic unit 38 of tags logic block 36b then performs another XOR operation whose inputs are the result of the first XOR operation and the bit previously stored in the associated tag register cell 22 of tags register 20b. The result of the second XOR operation is stored in the associated tag register cell 22 of tags register 20b.

Referring now to FIG. 4, the activities of array processor 10 in blocks 72, 74 and 76 now will be described in detail.

Block 72 is a compare cycle. All mask register cells 26 are set to "0" except for the mask register cell 26 corresponding to the column 18 that stores bits a[m;q]. One of tags logic blocks 36 broadcasts "1"s to all rows 16. The resulting match signals indicate whether the respective bits a[m;q] are "0" or "1". Each logic unit 38 of tags logic block 36a performs an XOR operation whose two inputs are the bit corresponding to the match signal received via match result line 34 and the bit previously stored in the corresponding tag register cell 22 of tags register 20b. The result of this XOR operation is stored in the associated tag register cell 22 of tags register 20a. Meanwhile, each logic unit 38 of tags logic block 36b performs an AND operation whose two inputs are the bit corresponding to the match signal received via match result line 34 and the bit previously stored in the associated tag register cell 22 of tags register 20b. The result of this AND operation is stored in the associated tag register cell 22 of tags register 20b. Finally, both tags registers 20a and 20b are shifted by Q−P to move the intermediate results in tags registers 20a and 20b to the rows 16 that will need these intermediate results in block 74. As a result of the shift, for each value of q between 1 and P, the intermediate results x[q] and y[q] that, prior to the shift, were stored in tag register cells 22 associated with the row 16 wherein a(q) is stored, now are stored in tag register cells 22 associated with the row 16 wherein a(q+Q−P) is stored.

Block 74 also is a compare cycle. All mask register cells 26 are set to "0" except for the mask register cell 26 corresponding to the column 18 that stores bits a[m;q]. One of tags logic blocks 36 broadcasts "1"s to all rows 16. The resulting match signals indicate whether the respective bits a[m;q] are "0" or "1". Each logic unit 38 of tags logic block 36a performs an XOR operation whose two inputs are the bit corresponding to the match signal received via match result line 34 and the bit previously stored in the associated tag register cell 22 of tags register 20a. The result of this XOR operation is stored in the associated tag register cell 22 of tags register 20a. Meanwhile, each logic unit 38 of tags logic block 36b performs an AND operation whose two inputs are the bit corresponding to the match signal received via match result line 34 and the bit previously stored in the corresponding tag register cell 22 of tags register 20a. Each logic unit 38 of tags logic block 36b then performs an OR operation whose two inputs are the output of the AND operation and the bit previously stored in the associated tag register cell 22 of tags register 20b. The result of this OR operation is stored in the associated tag register cell 22 of tags register 20b. Finally, both tags registers 20a and 20b are shifted by P–Q, so that, for each value of q between 1 and P, the intermediate results x[q] and y[q] are once again stored in tag register cells 22 associated with the row 16 wherein a(q) is stored.

Block 76 is a write cycle. All mask register cells 26 are set to "0" except for the mask register cell 26 corresponding to the column 18 that stores bits a[m;q]. Tags logic block 36a broadcasts the contents of tag register cells 22 of tags register 20a to all rows 16, as write enable signals. This results in the contents of tag register cells 22 of tags register 20a being written over a[m;q].

Referring now to FIG. 5, the activities of array processor 10 in blocks 86, 88 and 90 now will be described in detail.

Block 86 is a compare cycle. All mask register cells 26 are set to "0" except for the mask register cell 26 corresponding to the column 18 that stores bits a[m;q]. One of tags logic blocks 36 broadcasts "1"s to all rows 16. The resulting match signals indicate whether the respective bits a[m;q] are "0" or "1". Each logic unit 38 of tags logic block 36a performs an XOR operation whose two inputs are the bit corresponding to the match signal received via match result line 34 and the bit previously stored in the corresponding tag register cell 22b. The result of this XOR operation is stored in the associated tag register cell 22 of tags register 20a. Meanwhile, each logic unit 38 of tags logic block 36b performs a NOT operation whose input is the bit corresponding to the match signal received via match result line 34. Each logic unit 38 of tags logic block 36b then performs an AND operation whose two inputs are the output of the NOT operation and the bit previously stored in the associated tag register cell 22 of tags register 20b. The result of this AND operation is stored in the associated tag register cell 22 of tags register 20b. Finally, both tags registers 20a and 20b are shifted by Q–P to move the intermediate results in tags registers 20a and 20b to the rows 16 that will need these intermediate results in block 88. As a result of the shift, for each value of q between 1 and P, the intermediate results x[q] and y[q] that, prior to the shift, were stored in tag register cells 22 associated with the row 16 wherein a(q) is stored, now are stored in tag register cells 22 associated with the row 16 wherein a(q+Q–P) is stored.

Block 88 also is a compare cycle. All mask register cells 26 are set to "0" except for the mask register cell 26 corresponding to the column 18 that stores bits a[m;q]. One of tags logic blocks 36 broadcasts "1"s to all rows 16. The resulting match signals indicate whether the respective bits a[m;q] are "0" or "1". Each logic unit 38 of tags logic block 36a performs an XOR operation whose two inputs are the bit corresponding to the match signal received via match result line 34 and the bit previously stored in the associated tag register cell 22 of tags register 20a. The result of this XOR operation is stored in the associated tag register cell 22 of tags register 20a. Meanwhile, each logic unit 38 of tags logic block 36b performs a NOT operation whose input is the bit corresponding to the match signal received via match result line 34. Each logic unit 38 of tags logic block 36b then performs an AND operation whose two inputs are the result of the NOT operation and the bit previously stored in the corresponding tag register cell 22 of tags register 20a. Each logic unit 38 of tags logic block 36b then performs an OR operation whose two inputs are the output of the AND operation and the bit previously stored in the associated tag register cell 22 of tags register 20b. The result of this OR operation is stored in the associated tag register cell 22 of tags register 20b. Finally, both tags registers 20a and 20b are shifted by P–Q, so that, for each value of q between 1 and P, the intermediate results x[q] and y[q] are once again stored in tag register cells 22 associated with the row 16 wherein a(q) is stored.

Block 90 is a write cycle. All mask register cells 26 are set to "0" except for the mask register cell 26 corresponding to the column 18 that stores bits a[m;q]. Tags logic block 36a broadcasts the contents of tag register cells 22 of tags register 20a to all rows 16, as write enable signals. This results in the contents of tag register cells 22 of tags register 20a being written over a[m;q].

While the invention has been described with respect to a limited number of embodiments, it will be appreciated that many variations, modifications and other applications of the invention may be made.

What is claimed is:

1. Given Q binary numbers a(q), where q is an index between 1 and Q, all of the binary numbers having a common number M of bits indexed by an index m between 1 and M, a method of, for a positive integer P that is less than Q and for all values of q between 1 and P, combining a(q) with a(q+Q–P) to produce M combination bits, comprising the steps of:

(a) providing an array processor that includes an array of content addressable memory (CAM) cells;

(b) storing the binary numbers in respective consecutive rows of said array;

(c) for each value of m between 1 and M: substantially simultaneously, for each value of q between 1 and P: performing at least one first logical operation having a match signal corresponding to the m-th bit of a(q) as an input thereof, thereby producing a first output, and (d) for each value of m between 1 and M: substantially simultaneously, for each value of q between 1 and P: performing at least one second logical operation having, as inputs thereof, a match signal corresponding to the m-th bit of a(q+Q–P) and said first output, thereby producing a second output.

2. The method of claim 1, wherein each said at least one first logical operation includes an AND operation; and wherein, for each value of m between 1 and M, for each value of q between 1 and P, said at least one second logical operation includes:

(A) an AND operation having, as one input thereof, said match signal corresponding to the m-th bit of a(q+Q–P); and (B) an XOR operation having, as inputs thereof, said first output and an output of said AND operation that has, as one input thereof, said match signal corresponding to the m-th bit of a(q+Q−P).

3. The method of claim 1, wherein each said at least one first logical operation includes an XOR operation, and wherein each said at least one second logical operation also includes an XOR operation.

4. The method of claim 1, further comprising the step of:
(e) for each value of m between 1 and M: for each value of q between 1 and P: storing said second output in one of said CAM cells as an m-th combination bit of a(q) and a(q+Q−P).

5. The method of claim 4, wherein said storing of said second output replaces the m-th bit of a(q) in said array with said second output.

6. The method of claim 4, wherein, for each value of m between 1 and M, said performing of said logical operations and said replacings are effected within at most three machine cycles.

7. The method of claim 1, wherein, for each value of m between 1 and M, for each value of q between 1 and P, said at least one first logical operation also has a respective carry bit as an input thereof; wherein the method further comprises the step of:
(e) for each value of m between 1 and M: substantially simultaneously, for each value of q between 1 and P: performing at least one third logical operation having, as inputs thereof, said match signal corresponding to the m-th bit of a(q) and said respective carry bit, thereby providing a third output;
wherein, for each value of m between 1 and M, for each value of q between 1 and P, said at least one second logical operation also has, as an input thereof, said third output; and wherein the method further comprises the step of:
(f) for each value of m between 1 and M: substantially simultaneously, for each value of q between 1 and P: performing at least one fourth logical operation having, as inputs thereof, said match signal corresponding to the m-th bit of a(q+Q−P) and said third output, thereby providing a fourth output.

8. The method of claim 7, wherein each said at least one third logical operation includes an XOR operation, and wherein each said at least one fourth logical operation also includes an XOR operation.

9. The method of claim 7, wherein each said at least one third logical operation includes an AND operation, and wherein, for each value of m between 1 and M, for each value of q between 1 and P, said at least one fourth logical operation includes:
(i) an AND operation having, as inputs thereof, said match signal corresponding to the m-th bit of a(q+Q−P) and said first output; and
(ii) an OR operation having, as inputs thereof, said first output and an output of said AND operation that has, as inputs thereof, said match signal corresponding to the m-th bit of a(q+Q−P) and said first output.

10. The method of claim 7, wherein, for each value of m between 1 and M, for each value of q between 1 and P:
(i) said at least one third logical operation includes:
(A) a NOT operation having as an input thereof said match signal corresponding to the m-th bit of a(q), and
(B) an AND operation having, as inputs thereof, said carry bit and an output of said NOT operation that has, as an input thereof, said match signal corresponding to the m-th bit of a(q); and (ii) said at least one fourth logical operation includes:
(A) a NOT operation having as an input thereof said match signal corresponding to the m-th bit of a(q+Q−P),
(B) an AND operation having, as inputs thereof, said first output and an output of said NOT operation that has, as an input thereof, said match signal corresponding to the m-th bit of a(q+Q−P), and
(C) an OR operation having, as inputs thereof, said third output and an output of said AND operation that has, as inputs thereof, said first output and an output of said NOT operation that has, as an input thereof, said match signal corresponding to the m-th bit of a(q+Q−P).

11. The method of claim 7, wherein, for each value of m between 1 and M, for each value of q between 1 and P, said at least one first logical operation, that has said match signal corresponding to the m-th bit of a(q) as an input thereof, includes an AND operation having, as inputs thereof, said match signal corresponding to the m-th bit of a(q) and said carry bit; and wherein said at least one second logical operation includes:
(A) an AND operation having, as inputs thereof, said match signal corresponding to the m-th bit of a(q+Q−P) and said third output; and
(B) an XOR operation having, as inputs thereof, said first output and an output of said AND operation that has, as inputs thereof, said match signal corresponding to the m-th bit of a(q+Q−P) and said third output.

12. The method of claim 7, wherein, for each value of m between 1 and M, for each value of q between 1 and P, said at least one first logical operation, that has said match signal corresponding to the m-th bit of a(q) as an input thereof, includes an XOR operation having, as inputs thereof, said match signal corresponding to the m-th bit of a(q) and said carry bit; and wherein said at least one second logical operation, that has said match signal corresponding to the m-th bit of a(q+Q−P) as an input thereof, includes an XOR operation having, as input thereof, said match signal corresponding to the m-th bit of a(q+Q−P) and said first output.

13. The method of claim 7, further comprising the step of:
(f) for each value of m between 1 and M, for each value of q between 1 and P: storing said fourth output in one of said CAM cells as an m-th combination bit of a(q) and a(q+Q−P).

14. The method of claim 13, wherein said storing of said fourth output replaces the m-th bit of a(q) in said array with said fourth output.

15. The method of claim 13, wherein, for each value of m between 1 and M, said performing of said logical operations and said storings are effected within at most three machine cycles.

16. The method of claim 7, wherein, for each value of m between 1 and M, for each value of q between 1 and P, said inputs of said first and third at least one logical operations include only said match signal corresponding to the m-th bit of a(q) and said respective carry bit.

17. The method of claim 7, wherein, for each value of m between 1 and M, for each value of q between 1 and P, at most seven said logical operations are effected.

18. The method of claim 7, wherein, for each value of m between 1 and M, for each value of q between 1 and P, at most five of said logical operations are binary logical operations.

19. The method of claim 7, wherein, for each value of m between 1 and M, for each value of q between 1 and P, at most five said logical operations are effected.

20. The method of claim 7, wherein, for each value of m between 1 and M, for each value of q between 1 and P, at most four said logical operations include said match signal corresponding to the m-th bit of a(q+Q−P) as inputs thereof.

21. The method of claim 7, wherein, for each value of m between 1 and M, for each value of q between 1 and P, at most three said logical operations include said match signal corresponding to the m-th bit of a(q+Q−P) as inputs thereof.

22. The method of claim 7, wherein at least one of said logical operations is an OR operation.

23. The method of claim 7, wherein, for each value of m between 1 and M, for each value of q between 1 and P, at most two of said logical operations are XOR operations.

24. The method of claim 7, wherein only said first and third at least one logical operations include XOR operations.

25. The method of claim 1, wherein said array processor further includes a first tags register including, for each row of said array, a respective first tag register cell, said first tags register also including, for each row of said array, a respective first logic unit operative to perform, within a single machine cycle, at least one logical operation on input including at least one operand selected from the group consisting of:
  (i) a bit stored in said respective first tag register cell immediately prior to said single machine cycle, and
  (ii) if said single machine cycle is a compare cycle: an output of a compare operation on said each row;
wherein, for each value of m between 1 and M, for each value of q between 1 and P, said at least one first logical operation having said match signal corresponding to the m-th bit of a(q) as an input thereof is performed using said respective first logic unit of said row wherein a(q) is stored, the method further comprising the steps of: for each value of m between 1 and M, prior to said performing of said second logical operations:
  (e) for each value of q between 1 and P: storing said first output in said respective first tag register cell of said row wherein a(q) is stored; and
  (f) shifting said first tags register by Q−P, so that, for each value of q between 1 and P, said first output now is stored in said respective first tag register cell of said row wherein a(q+Q−P) is stored;
and wherein, for each value of m between 1 and M, for each value of q between 1 and P, said at least one second operation, that has, as inputs thereof, said match signal corresponding to the m-th bit of a(q+Q−P) and said first output, is performed using said respective first logic unit of said row wherein a(q+Q−P) is stored.

26. The method of claim 25, further comprising the steps of, for each value of m between 1 and M, subsequent to said performing of said second logical operations:
  (g) for each value of q between 1 and P: storing said second output in said respective first tag register cell of said row wherein a(q+Q−P) is stored; and
  (h) shifting said first tags register by P−Q, so that, for each value of q between 1 and P, said second output now is stored in said respective first tags register cell of said row wherein a(q) is stored.

27. The method of claim 26, further comprising the step of, for each value of m between 1 and M, for each value of q between 1 and P:
  (i) replacing the m-th bit of a(q) with said second output.

28. The method of claim 25, wherein said array processor further includes a second tags register including, for each row of said array, a respective second tag register cell, said second tags register also including, for each row of said array, a respective second logic unit operative to perform, within a single machine cycle, at least one logical operation on input including at least two operands selected from the group consisting of:
  (i) said bit stored in said respective first tag register cell immediately prior to said single machine cycle,
  (ii) a bit stored in said respective second tag register cell immediately prior to said single machine cycle, and
  (iii) if said single machine cycle is a compare cycle: said output of said compare operation on said each row;
wherein, for each row of said array, said respective first logical unit also is operative to perform, within a single machine cycle, at least one logical operation on input including at least two operands selected from the group consisting of:
  (i) said bit stored in said respective first tag register cell immediately prior to said single machine cycle,
  (ii) said bit stored in said respective second tag register cell immediately prior to said single machine cycle, and
  (iii) if said single machine cycle is a compare cycle: said output of said compare operation on said each row;
wherein, for each value of m between 1 and M, for each value of q between 1 and P, said at least one first logical operation also has a respective carry bit as an input thereof, wherein the method further comprises the step of:
  (g) for each value of m between 1 and M:
    (i) for each value of q between 1 and P:
      (A) performing at least one third logical operation having as inputs thereof said match signal corresponding to the m-th bit of a(q) and said respective carry bit, using said respective second logic unit of said row wherein a(q) is stored, thereby providing a third output, and
      (B) storing said third output in said respective second tag register cell of said row wherein a(q) is stored;
    (ii) shifting said second tags register by Q−P, so that, for each value of q between 1 and P, said third output now is stored in said respective second tag register cell of said row wherein a(q+Q−P) is stored; and
    (iii) performing at least one fourth logical operation having as inputs thereof said match signal corresponding to the m-th bit of a(q+Q−P) and said third output, using said respective second logic unit of said row wherein a(q+Q−P) is stored, thereby providing a fourth output.

29. The method of claim 28, further comprising the steps of, for each value of m between 1 and M:
  (h) for each value of q between 1 and P, storing said fourth output in said respective second tag register cell of said row wherein a(q+Q−P) is stored; and
  (i) shifting said second tags register by P−Q, so that, for each value of q between 1 and P, said fourth output now is stored in said respective second tag register cell of said row wherein a(q) is stored.

30. The method of claim 29, further comprising the step of, for each value of m between 1 and M, for each value of q between 1 and P:
  (j) replacing the m-th bit of a(q) with said fourth output.

31. The method of claim 28, wherein only said first logic units are configured to perform XOR operations.

32. Given Q binary numbers a(q), where q is an index between 1 and Q, all of the binary numbers having a common number M of bits indexed by an index m between 1 and M, a method of, for a positive integer P that is less than Q and for all values of q between 1 and P, adding a(q) to a(q+Q−P), comprising the steps of:

(a) providing an array processor that includes an array of content addressable memory (CAM) cells;
(b) storing the binary numbers in respective consecutive rows of said array;
(c) for each value of m between 1 and M: substantially simultaneously, for each value of q between 1 and P:
  (i) performing at least one first logical operation having, as inputs thereof, a match signal corresponding to the m-th bit of a(q) and a respective carry bit, thereby producing a first output, and
  (ii) performing at least one second logical operation having, as inputs thereof, said match signal corresponding to the m-th bit of a(q) and said respective carry bit, thereby producing a second output; and
(d) for each value of m between 1 and M: substantially simultaneously, for each value of q between 1 and Q:
  (i) performing at least one third logical operation having, as inputs thereof, a match signal corresponding to the m-th bit of a(q+Q−P) and said first output, thereby producing a third output, and
  (ii) performing at least one fourth logical operation having, as inputs thereof, said match signal corresponding to the m-th bit of a(q+Q−P) and said second output, thereby providing a fourth output.

33. The method of claim 32, further comprising the step of, for each value of m between 1 and M, for each value of q between 1 and P:
  (e) storing said third output in one of said CAM cells as a sum bit.

34. The method of claim 33, wherein said storing of said third output replaces the m-th bit of a(q) in said array with said third output.

35. The method of claim 33, wherein, for each value of m between 1 and M, said logical operations and said storing are effected within at most three machine cycles.

36. The method of claim 32, further comprising the step of, for each value of m between 1 and M, for each value of q between 1 and P:
  (e) storing said fourth output in one of said CAM cells as a sum bit.

37. The method of claim 36, wherein said storing of said fourth output replaces the m-th bit of a(q) in said array with said fourth output.

38. The method of claim 36, wherein, for each value of m between 1 and M, said logical operations and said storing are effected within at most three machine cycles.

39. The method of claim 32, wherein, for each value of m between 1 and M, for each value of q between 1 and P, said inputs of said first and second at least one logical operations include only said match signal corresponding to the m-th bit of a(q) and said respective carry bit.

40. The method of claim 32, wherein, for each value of m between 1 and M, for each value of q between 1 and P, at most five said logical operations are effected.

41. The method of claim 32, wherein, for each value of m between 1 and M, for each value of q between 1 and P, at most three said logical operations include said match signal corresponding to the m-th bit of a(q+Q−P) as inputs thereof.

42. The method of claim 32, wherein at least one of said logical operations is an OR operation.

43. The method of claim 32, wherein, for each value of m between 1 and M, for each value of q between 1 and P, at most two said logical operations are XOR operations.

44. The method of claim 32, wherein only said first and second at least one logical operations include XOR operations.

45. The method of claim 32, wherein said array processor further includes a first tags register and a second tags register, each said tags register including, corresponding to each row of said array, a respective tag register cell, each said tags register also including, corresponding to each row of said array, a respective logic unit operative to perform, within a single machine cycle, at least one logical operation on input including at least two operands selected from the group consisting of:
  (i) a bit stored in said respective tag register cell of said first tags register immediately prior to said single machine cycle,
  (ii) a bit stored in said respective tag register cell of said second tags register immediately prior to said single machine cycle, and
  (iii) if said single machine cycle is a compare cycle: an output of a compare operation on said each row;
wherein, for each value of m between 1 and M, for each value of q between 1 and P:
  (i) said at least one first logical operation is effected using said respective logic unit, of said first tags register, that corresponds to said row wherein a(q) is stored,
  (ii) said first output is stored in said respective tag register cell, of said first tags register, that corresponds to said row wherein a(q) is stored,
  (iii) said at least one second logical operation is effected using said respective logic unit, of said second tags register, that corresponds to said row wherein a(q) is stored, and
  (iv) said second output is stored in said respective tag register cell, of said second tags register, that corresponds to said row wherein a(q) is stored;
the method further comprising the step of:
  (e) for each value of m between 1 and M, subsequent to said first and second logical operations, shifting said first and second tags registers by Q−P, so that, for each value of q between 1 and P, said first output now is stored in said respective tag register cell, of said first tags register, that corresponds to said row wherein a(q+Q−P) is stored, and said second output now is stored in said respective tag register cell, of said second tags register, that corresponds to said row wherein a(q+Q−P) is stored;
and wherein, for each value of m between 1 and M, for each value of q between 1 and P:
  (i) said at least one third logical operation is effected using said respective logic unit, of said first tags register, that corresponds to said row wherein a(q+Q−P) is stored,
  (ii) said third output is stored in said respective tag register cell, of said first tags register, that corresponds to said row wherein a(q+Q−P) is stored,
  (iii) said at least one fourth logical operation is effected using said respective logic unit, of said second tags register, that corresponds to said row wherein a(q+Q−P) is stored, and
  (iv) said fourth output is stored in said respective tag register cell, of said second tags register, that corresponds to said row wherein a(q+Q−P) is stored.

46. The method of claim 45, further comprising the step of:
  (f) for each value of m between 1 and M, subsequent to said third and fourth logical operations, shifting said first and second tags registers by P−Q, so that, for each value of q between 1 and P, said third output now is stored in said respective tag register cell, of said first tags register, that corresponds to said row wherein a(q) is stored, and said fourth output now is stored in said respective tag register cell, of said second tags register, that corresponds to said row wherein a(q) is stored.

47. Given Q binary numbers a(q), where q is an index between 1 and Q, all of the binary numbers having a common number M of bits indexed by an index m between 1 and M, a method of, for a positive integer P that is less than Q and for all values of q between 1 and P, subtracting a(q+Q−P) from a(q), comprising the steps of:
  (a) providing an array processor that includes an array of content addressable memory (CAM) cells;
  (b) storing the binary numbers in respective consecutive rows of said array;
  (c) for each value of m between 1 and M: substantially simultaneously, for each value of q between 1 and P:
    (i) performing at least one first logical operation having, as inputs thereof, a match signal corresponding to the m-th bit of a(q) and a respective carry bit, thereby producing a first output, and
    (ii) performing at least one second logical operation having, as inputs thereof, said match signal corresponding to the m-th bit of a(q) and said respective carry bit, thereby producing a second output; and
  (d) for each value of m between 1 and M: substantially simultaneously, for each value of q between 1 and Q:
    (i) performing at least one third logical operation having, as inputs thereof, a match signal corresponding to the m-th bit of a(q+Q−P) and said first output, thereby producing a third output, and
    (ii) performing at least one fourth logical operation having, as inputs thereof, said match signal corresponding to the m-th bit of a(q+Q−P) and said second output, thereby providing a fourth output.

48. The method of claim 47, further comprising the step of, for each value of m between 1 and M, for each value of q between 1 and P:
  (d) storing said third output in one of said CAM cells as a difference bit.

49. The method of claim 48, wherein said storing of said third output replaces the m-th bit of a(q) with said third output.

50. The method of claim 48, wherein, for each value of m between 1 and M, said logical operations and said storing are effected within at most three machine cycles.

51. The method of claim 47, wherein, for each value of m between 1 and M, for each value of q between 1 and P, said inputs of said first and second at least one logical operations include only said match signal corresponding to the m-th bit of a(q) and said respective carry bit.

52. The method of claim 47, wherein, for each value of m between 1 and M, for each value of q between 1 and P, at most seven said logical operations are effected.

53. The method of claim 52, wherein at most five of said seven logical operations are binary logical operations.

54. The method of claim 47, wherein, for each value of m between 1 and M, for each value of q between 1 and P, at most four said logical operations include said match signal corresponding to the m-th bit of a(q+Q−P) as inputs thereof.

55. The method of claim 47, wherein at least one of said logical operations is an OR operation.

56. The method of claim 47, wherein only said first and second at least one logical operations include XOR operations.

57. The method of claim 47, wherein said array processor further includes a first tags register and a second tags register, each said tags register including, corresponding to each row of said array, a respective tag register cell, each said tags register also including, corresponding to each row of said array, a respective logic unit operative to perform, within a single machine cycle, at least one logical operation on input including at least two operands selected from the group consisting of:
  (i) a bit stored in said respective tag register cell of said first tags register immediately prior to said single machine cycle,
  (ii) a bit stored in said respective tag register cell of said second tags register immediately prior to said single machine cycle, and
  (iii) if said single machine cycle is a compare cycle: an output of a compare operation on said each row;
wherein, for each value of m between 1 and M, for each value of q between 1 and P:
  (i) said at least one first logical operation is effected using said respective logic unit, of said first tags register, that corresponds to said row wherein a(q) is stored,
  (ii) said first output is stored in said respective tag register cell, of said first tags register, that corresponds to said row wherein a(q) is stored,
  (iii) said at least one second logical operation is effected using said respective logic unit, of said second tags register, that corresponds to said row wherein a(q) is stored, and
  (iv) said second output is stored in said respective tag register cell, of said second tags register, that corresponds to said row wherein a(q) is stored;
the method further comprising the step of:
  (e) for each value of m between 1 and M, subsequent to said first and second logical operations, shifting said first and second tags registers by Q−P, so that, for each value of q between 1 and P, said first output now is stored in said respective tag register cell, of said first tags register, that corresponds to said row wherein a(q+Q−P) is stored, and said second output now is stored in said respective tag register cell, of said second tags register, that corresponds to said row wherein a(q+Q−P) is stored;
and wherein, for each value of m between 1 and M, for each value of q between 1 and P:
  (i) said at least one third logical operation is effected using said respective logic unit, of said first tags register, that corresponds to said row wherein a(q+Q−P) is stored,
  (ii) said third output is stored in said respective tag register cell, of said first tags register, that corresponds to said row wherein a(q+Q−P) is stored,
  (iii) said at least one fourth logical operation is effected using said respective logic unit, of said second tags register, that corresponds to said row wherein a(q+Q−P) is stored, and
  (iv) said fourth output is stored in said respective tag register cell, of said second tags register, that corresponds to said row wherein a(q+Q−P) is stored.

58. The method of claim 57, further comprising the step of:
  (f) for each value of m between 1 and M, subsequent to said third and fourth logical operations, shifting said first and second tags registers by P−Q, so that, for each value of q between 1 and P, said third output now is stored in said respective tag register cell, of said first tags register, that corresponds to said row wherein a(q) is stored, and said fourth output now is stored in said respective tag register cell, of said second tags register, that corresponds to said row wherein a(q) is stored.

* * * * *